(12) United States Patent
Bilz et al.

(10) Patent No.: US 6,497,622 B1
(45) Date of Patent: Dec. 24, 2002

(54) CONSTANT VELOCITY FIXED JOINT WITH CROSS-GROOVE TRACKS

(75) Inventors: Peter Bilz, Freigericht (DE); Peter Schwarzler, Glattbach (DE); Frank Braun, Frankfurt (DE); Russell Osborn, Birmingham (GB)

(73) Assignee: GKN Lobro GmbH, Offenbach (DE)

( * ) Notice: Subject to any disclaimer, the term of this patent is extended or adjusted under 35 U.S.C. 154(b) by 0 days.

(21) Appl. No.: 09/721,314

(22) Filed: Nov. 22, 2000

(30) Foreign Application Priority Data

Nov. 25, 1999 (DE) ......................... 199 56 672

(51) Int. Cl.$^7$ ............................. F16D 3/223
(52) U.S. Cl. ................... 464/144; 384/495; 384/523
(58) Field of Search ................ 464/144, 145, 464/906; 384/495, 523

(56) References Cited

U.S. PATENT DOCUMENTS

| | | | |
|---|---|---|---|
| 2,047,660 A | * 7/1936 | Anderson | 464/144 |
| 2,322,570 A | 12/1943 | Dodge | |
| 5,944,612 A | * 8/1999 | Schwarzler | 464/144 |
| 6,132,316 A | * 10/2000 | Statham | 464/145 |
| 6,280,337 B1 | * 8/2001 | Wormsbacher et al. | 464/146 |

FOREIGN PATENT DOCUMENTS

| | | |
|---|---|---|
| DE | 42 28 230 A1 | 3/1993 |
| GB | 2 318 853 A | 5/1998 |

* cited by examiner

Primary Examiner—Greg Binda (57) ABSTRACT

A constant velocity fixed joint comprising an outer joint part forming an annular member with a first longitudinal axis and comprising first ball tracks. The first ball tracks extend at a distance from the first longitudinal axis and each form a first angle of crossing therewith. The joint also includes an inner joint part forms a hub with a second longitudinal axis and comprising second ball tracks. The second ball tracks extend at a distance from the second longitudinal axis and each form a second angle of crossing therewith. The first ball tracks and the second ball tracks are circurnferentially distributed and associated with one another in pairs, with the first angles of crossing and the second angles of crossing of the pairs of ball tracks being identical in size and opening in opposite directions relative to the longitudinal axes. When the longitudinal axes coincide, the points of intersection of the pairs of ball tracks form a central joint plane. The joint also includes an annular ball cage arranged between the outer joint part and the inner joint part and comprising circumferentially distributed cage windows in which torque transmitting balls are held in a common plane. The outer joint part comprises two separate circumferential areas which are positioned on either side of the central joint plane and which are interrupted by the first ball tracks and which, as inner guiding faces, are simultaneously in guiding contact with an outer counter face of the ball cage.

8 Claims, 10 Drawing Sheets

CONSTANT VELOCITY FIXED JOINT WITH CROSS-GROOVE TRACKS

BACKGROUND OF THE INVENTION

The invention relates to a constant velocity fixed joint with the following features: an outer joint part forming an annular member with a first longitudinal axis and comprising first ball tracks; an inner joint part forming a hub with a second longitudinal axis and comprises second ball tracks; first and second ball tracks associated with one another in pairs; and an annular ball cage arranged between the outer joint part and the inner joint part and comprising circumferentially distributed cage windows in which torque transmitting balls are held in a common plane.

The pairs of ball tracks of fixed joints are normally positioned in radial planes and are designed in such a way that the center lines of the first ball tracks and of the second ball tracks behave mirror-symmetrically relative to one another with respect to a central joint plane and intersect one another in the central joint plane. Tangents on the ball tracks in the central plane form oppositely directed control angles of identical sizes with the respective longitudinal axes of the two joint parts.

The production of ball tracks of the above design which are normally curved and which, if viewed in the axial direction, are sometimes undercut, is disadvantageous from the point of view of production technology.

From DE 42 28 230 A1 there are known joints with pairs of tracks whose center lines extend at a distance from one another at an angle of crossing relative to the respective center lines and which intersect one another in pairs. Said joints are axially fixed as a result of the mutual surface contact mutual engagement between spherical areas on the inner face of the outer joint part and the outer face of the ball cage or also between spherical areas on the outer face of the inner joint part and the inner face of the ball cage. When the joint rotates in an articulated condition, said mutual surface contacts generate high friction and thus disadvantageously high operating temperatures in the joint. In the case of axial loads, the surface parts contacting one another may be subject to self-inhibition and wedging.

SUMMARY OF THE INVENTION

It is an object of the present invention to provide constant velocity fixed joints which can be produced economically and which, at least within the range of small articulation angles, are suitable for high speeds.

According to the present invention, the foregoing object is achieved by a constant velocity fixed joint comprising an outer joint part forming an annular member with a first longitudinal axis and comprising first ball tracks. The first ball tracks extend at a distance from the first longitudinal axis and each form a first angle of crossing therewith. The joint also includes an inner joint part forming a hub with a second longitudinal axis and comprising second ball tracks. The second ball tracks extend at a distance from the second longitudinal axis and each form a second angle of crossing therewith. The first and second ball tracks are circumferentially distributed and associated with one another in pairs, with the first angles of crossing and the second angles of crossing of the pairs of ball tracks being identical in size and opening in opposite directions relative to the longitudinal axes. When the longitudinal axes coincide, the points of intersection of the pairs of ball tracks form a central joint plane. The joint further includes an annular ball cage arranged between the outer joint part and the inner joint part and comprising circumferentially distributed cage windows in which torque transmitting balls are held in a common plane.

In a first variant, the outer joint part comprises two separate circumferential areas which are positioned on either side of the central joint plane and which are interrupted by the first ball tracks and which, as inner guiding faces, are simultaneously in guiding contact with an outer counter face of the ball cage. In a second variant, the inner joint part comprises two separate circumferential areas which are positioned on either side of the central joint plane and which are interrupted by the second ball tracks and which, as outer guiding faces, are simultaneously in guiding contact with an inner counter face of the ball cage. In approximation, the ball cage forms a central portion of a spherical shell of an approximately constant wall thickness.

The present joint is advantageous in that joints of this type can be produced particularly easily and cost-effectively in that the tracks, especially at the outer joint parts, can be produced by simple machining operations, preferably by broaching. Subsequently, these tracks can be hardened. The undercut faces which are optionally required at the outer joint parts and by which the guiding faces are formed can be turned (hard-turned) after the ball tracks have been produced and hardened. The tracks may extend helically or in straight lines. In the former case, the angle of intersection has to be referred to tangents to the tracks.

By reducing the guiding faces to two annular faces interrupted by tracks, the inner friction is low and the running-in phase takes place at an accelerated rate. Even during the running-in phase, the heat development remains uncritical. Corresponding contact pairing takes place at an early stage, which results in a good rate of efficiency.

It is particularly advantageous if, in the first variant, the outer joint part and, in the second variant, the inner joint part is permanently provided with play relative to the respective counter face of the ball cage. As a result, the forces acting on the ball cage are reduced, and in this way, the development of heat is even easier to control, with a greater efficiency being achieved. However, in principle, it is also possible to provide cage guiding faces both at the outer joint part and at the inner joint part.

According to the first variant, the outer joint part is provided with inner guiding faces. According to the above, it is preferably the outer face of the inner joint part which is provided with play relative to the inner surface of the ball cage. Said outer face of the inner joint part can be formed, for example, by a smaller spherical face with a central cylindrical turned region. In this, the relatively large effective diameter of the guiding faces is advantageous in that it keeps the area pressure low.

The sub-claims and figures describe some examples for designing the guiding faces at the outer joint part and for designing the respective counter faces to which reference is hereby made. The two surfaces which contact one another can differ from said examples in that they deviate from a spherical form.

According to the second variant, the guiding faces are provided on the outside of the inner joint part, with the respective counter faces being provided on the inside of the ball cage. Again, according to the above, it is advantageous if the inner face of the outer joint part is provided with play relative to the outer face of the ball cage, the first being preferably entirely cylindrical because, from a production point of view, this is particularly easy. This is advantageous in that undercut faces at the outer joint part can be eliminated, which simplifies production.

For these designs of guiding faces and corresponding counter faces, too, it is possible to find examples in the sub-claims and figures to which, again, reference is made. In this case, too, the two surfaces which contact one another can differ from the examples mentioned in that they deviate from a spherical form.

As a result of providing the ball cage with play relative to the respective second one of the joint parts, functioning is not adversely affected, not even in those cases where, when the joint is articulated, the shape of the guiding faces forcibly causes the ball cage to be offset or displaced relative to the joint center. This is always the case if the sliding surfaces at the cage are not provided in the form of entirely (with reference to the joint center) centric spherical faces.

Especially by using existing equipment normally used for VL plunging joints, the joints in accordance with the invention can be produced advantageously. At smaller to medium-sized angles, they are functionally safe, even at high speeds. They are therefore highly suitable as fixed joints in unsteered rear axles of motor vehicles where they can be combined with prior art cross-groove joints in driveshafts. A particular advantage refers to the fact that they are extremely short in the axial direction. This does not mean that the outer joint part, which is basically annular, cannot be provided with an integrally formed-on base. Due to the fact that the balls are always controlled by the angles of intersection of the tracks and that, in consequence, the ball cage has no active control function, it is possible to fit the balls in the ball tracks in a radially play-free way, i.e. the balls are subjected to pressure in the pairs of tracks. As a result, the joint operates at a low noise level.

BRIEF DESCRIPTION OF THE DRAWINGS

Preferred embodiments of the invention are illustrated in the attached drawings and will be described with reference thereto.

FIG. 1 shows an embodiment of a joint of the type concerned with an annular outer part, A) in a longitudinal section along line A—A of FIG. 1B;
B) in a cross-section; and
C) in a circumferential view across the ball tracks.

FIG. 2 shows a joint of the type concerned with an annular outer part and a formed-on base, A) in a longitudinal section along line A—A of FIG. 2B;
B) in a cross-section; and
C) in a circumferential view across the ball tracks.

DETAILED DESCRIPTION OF THE INVENTION

Figure 1A:
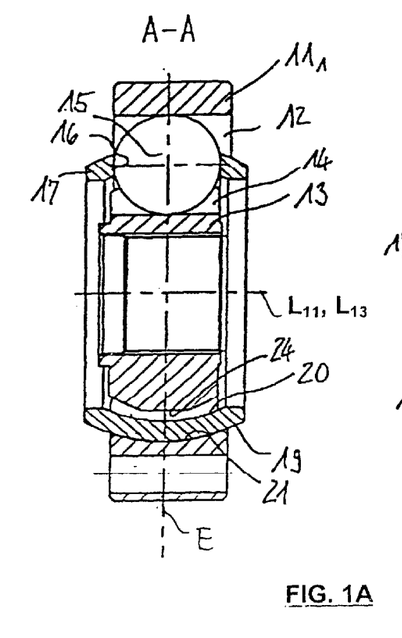
Figure 1B:
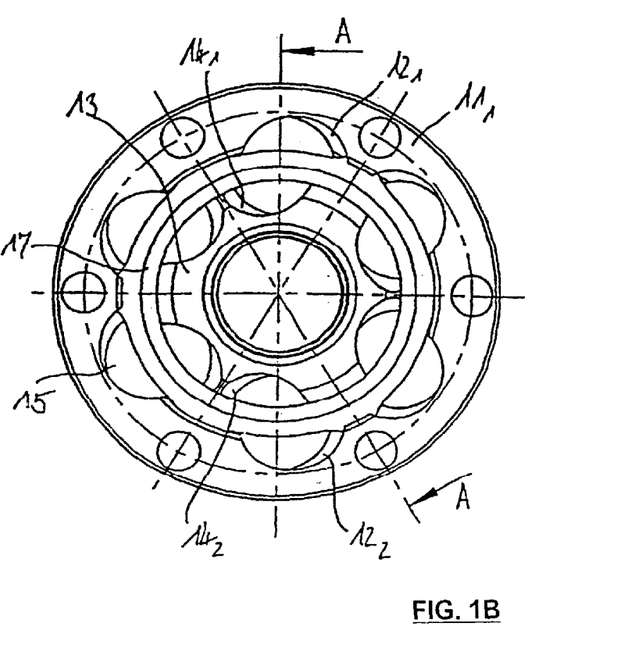
Figure 1C:
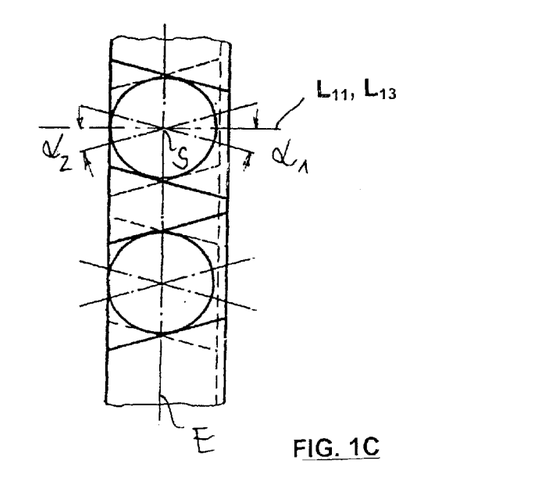

FIGS. 1A, 1B and 1C will be described jointly below, show a constant velocity universal joint according to the present invention which comprises an annular outer joint part $11_1$ with inner first ball tracks 12 which comprise an angle of crossing relative to the longitudinal axis $L_{11}$ of the outer joint part 11 and which extend in straight lines.

Of the first ball tracks 12 if viewed across the circumference as shown in FIG. 1C, first ones of the first ball tracks $12_1$ comprise a first angle of crossing $\alpha_1$ and second ones of the first ball tracks $12_2$ comprise a first angle of crossing $\alpha_1'$ of equal size and opening in the opposite direction, relative to the longitudinal axis $L_{11}$. Furthermore, the joint comprises a hub-shaped inner joint part 13 having circumferentially distributed outer second ball tracks 14. Relative to the longitudinal axis $L_{13}$ of the inner joint part 13 which coincides with the longitudinal axis $L_{11}$, the second ball tracks 14 comprise an angle of crossing and extend in straight lines. If viewed across the circumference, first ones of the second ball tracks $14_1$ each comprise a second angle of crossing $\alpha_2$ and second ones of the second ball tracks $14_2$ each comprise a second angle of crossing $\alpha_2'$ of equal size and opening in the opposite direction, relative to the longitudinal a $L_{13}$.

The first ball tracks 12 and the second ball tracks 14 are distributed across the circumference and associated with one another in pairs, with the angles of crossing $\alpha_1$, $\alpha_2$ and $\alpha_1'$, $\alpha_2'$ and relative to their respective longitudinal axis in the individual pairs $12_1/14_1$, $12_2/14_2$, being of equal size and extending in opposite directions relative to the respective longitudinal axis. The angles of crossing $\alpha_1$, $\alpha_2$, $\alpha_1'$, $\alpha_2'$ can range between 11° and 15°, for example. The respective angles of crossing intersect at a point S. In this way it is possible to ensure the control function of the ball tracks for the balls 15 received by the respective pairs of tracks. The balls 15 are held in a common plane (central joint plane E) in cage windows 16 of an annular ball cage 17 having the shape of a central portion of a spherical shell. As can be seen in the longitudinal section, the ball cage 17 comprises an outer spherical surface 19 and an inner spherical surface 20 and has an approximately constant wall thickness. The outer surface 19 engages the identically shaped inner face 21 of the outer joint part 11 in a mutual surface contact way. The inner surface 20 of the cage is provided with play relative to the outer face 24 of the inner joint part 13, which outer face 24 consists of a spherical portion with a turned cylindrical region.

Figure 2A:
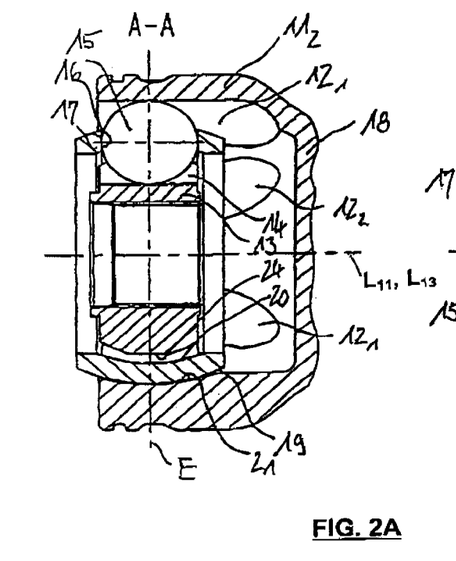
Figure 2B:
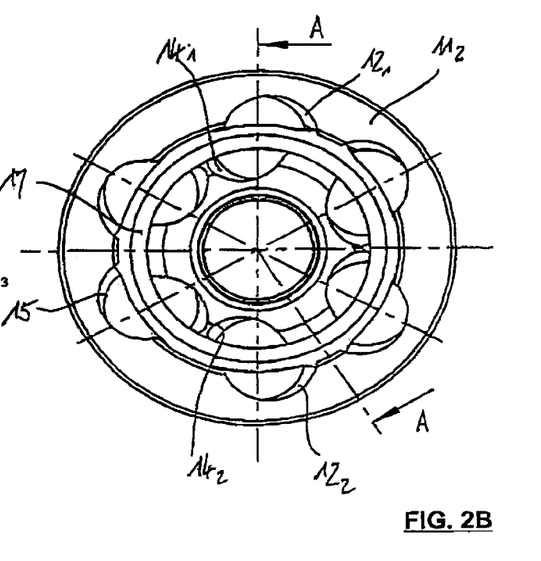
Figure 2C:
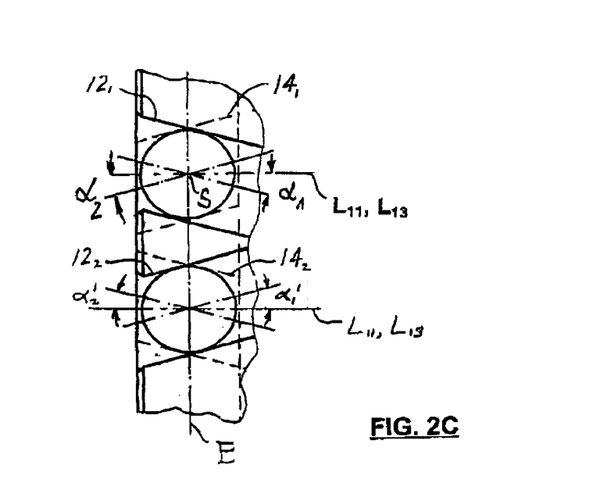

FIGS. 2A, 2B, and 2C which will be described jointly below, show a constant velocity universal joint of the same species which comprises an annular outer part $11_2$ with a formed-on base 18 and with inner first ball tracks 12 which comprise an angle of crossing relative to the longitudinal axis $L_{11}$ of the outer joint part, which extend in straight lines and which, as can be seen, extend at a distance from the base part 18. Of the first ball tracks 12, if viewed in the circumferential direction shown in FIG. 2C, first ones of the first ball tracks $12_1$ each comprise a first angle of crossing $\alpha_1$ and second ones of the first ball tracks $12_2$ each comprise a first angle of crossing $\alpha_1'$ which is of equal size and opens in the opposite direction, relative to the longitudinal axis $L_{11}$. Furthermore, the joint comprises a hub-shaped inner joint part 13 with outer, circumferentially distributed second ball tracks 14. Relative to the longitudinal axis $L_{13}$ of the inner joint part 13 coinciding with the longitudinal axis $L_{11}$, the second ball tracks 14 comprise an angle of crossing and extend in straight lines. If viewed across the circumference, first ones of the second ball tracks $14_1$ comprise a second angle of crossing $\alpha_2$ and second ones of the second ball tracks $14_2$ comprise a second angle of crossing $\alpha_2'$ which is of equal size and opens in the opposite direction, relative to the longitudinal axis $L_{13}$.

The first ball tracks 12 and the second ball tracks 14 are distributed across the circumference and associated with one another in pairs, with the angles of crossing $\alpha_1$, $\alpha_2$, and $\alpha_1'$, $\alpha_2'$ relative to their respective longitudinal axis in the individual pairs $12_1/14_1$, $12_2/14_2$, being of equal size and extending in opposite directions relative to the respective longitudinal axis. The angles of crossing $\alpha_1$, $\alpha_2$, $\alpha_1'$ and $\alpha_2'$ can range between 11° and 15° for example. The respective angles of crossing intersect at a point S. In this way it is possible to ensure the control function of the ball tracks for the balls 15 received by the respective pairs of tracks. The balls 15 are held in a common plane (central joint plane E) in cage windows 16 of an annular ball cage 17 having the shape of a portion of a spherical shell. As can be seen in the longitudinal section, the ball cage 17 comprises an outer spherical surface 19 and an inner spherical surface 20. The outer surface 19 engages the identically shaped inner face 21 of the outer joint part 11 in a mutual surface contact way. The inner surface 20 of the cage is provided with play relative to the outer face 24 of the inner joint part 13, which outer face 24 consists of a spherical portion with a turned cylindrical region.

Figure 3:
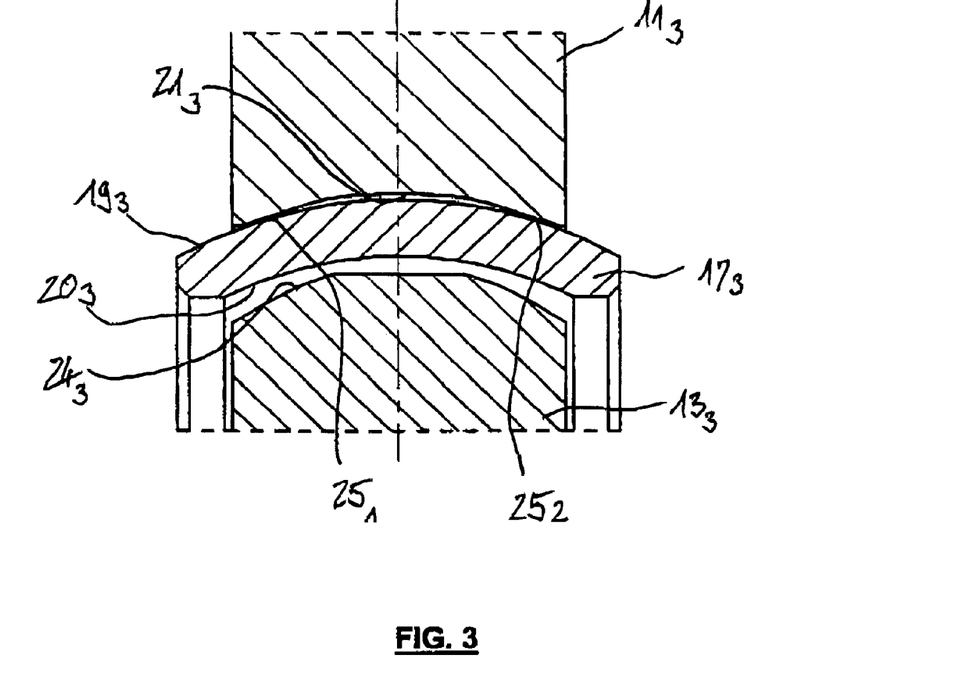
FIG. 3 shows a partial section through an inventive joint in a first embodiment.

FIG. 3 shows a partial section through an inventive joint, with the outer joint part $11_3$, the inner joint part $13_3$ and the ball cage $17_3$ being sectioned in a plane between the ball tracks. The outer surface $19_3$ of the ball cage $17_3$ is entirely spherical with a center of curvature arranged concentrically in the joint center. On the other hand, the inner face $21_3$ of the outer joint part $11_3$, in a longitudinal section, is composed of two symmetric conical portions which are connected to one another by a central face of any shape at a distance from the surface $19_3$ of the ball cage $17_3$. As a result, there are obtained two approximately edge-like annular faces at the outer joint part $11_3$ which act as guiding faces $25_1$, $25_2$ for the ball cage $17_3$. When the joint is articulated, the guiding faces $25_1$, $25_2$ do not change their positions when the ball cage $17_3$ is in an angle-bisecting position between the outer joint part and inner joint part articulated relative to one another. The inner surface $20_3$ of the ball cage $17_3$ of the ball cage $17_3$ is also spherical with its center of curvature being arranged concentrically in the joint center, but in this case has no function. The outer face $24_3$ of the inner joint part $13_3$ is composed of a central cylindrical face arranged at a distance from the inner surface $20_3$ and of two curved surface portions of any shape at a distance from the inner face $20_3$ of the ball cage $17_3$.

Figure 4:
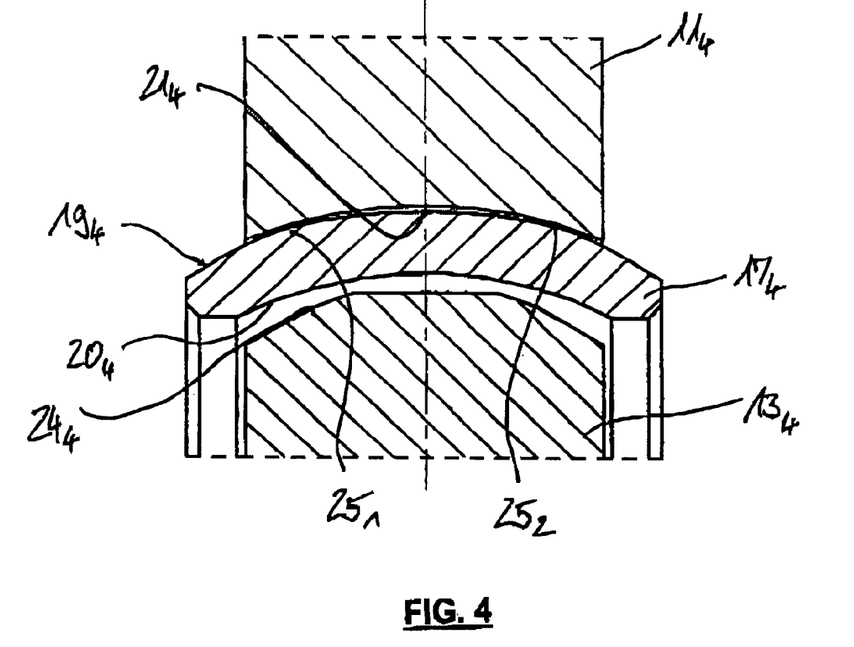
FIG. 4 shows a partial section through an inventive joint in a second embodiment.

FIG. 4 is a partial section through an inventive joint, with the outer joint part $11_4$, the inner joint part $13_4$ and the ball cage $17_4$ being sectioned in a plane between the ball tracks. The outer surface $19_4$ of the ball cage $17_4$ is a continuously curved surface which extends symmetrically relative to the central plane. The curvature is such that, in half a longitudinal section, it forms two points of contact with a circumscribed circle, i.e., it is at least a second order curve such as a parabolic curve. The inner face $21_4$ of the outer joint part $11_4$ constitutes an entirely spherical portion and thus, in the longitudinal section, forms such a circumscribed circle. As a result, there are obtained two approximately edge-like annular faces at the outer joint part $11_4$ which act as guiding faces $25_1$, $25_2$ for the ball cage $17_4$.

Figure 5:
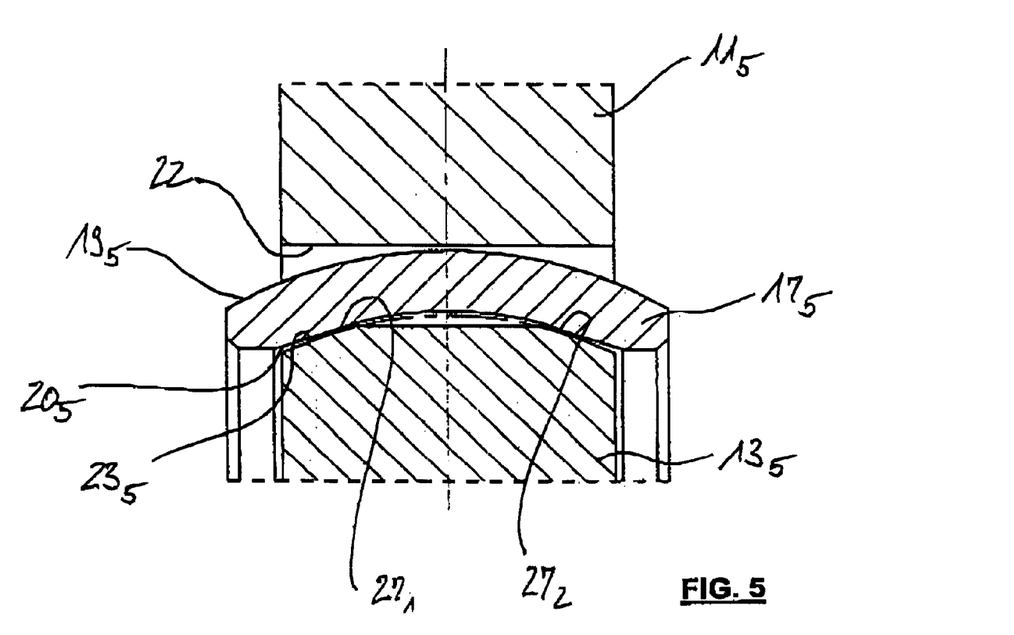
FIG. 5 shows a partial section through an inventive joint in a third embodiment.

FIG. 5 shows a partial section through an inventive joint wherein the outer joint part $11_5$, the inner joint part $13_5$ and the ball cage $17_5$ are sectioned in the region between two ball tracks. The cage $17_5$ comprises a spherical outer surface $19_5$ whose center is positioned concentrically in the joint center, but which has no further function. The outer joint part $11_5$ comprises an entirely cylindrical inner face 22 which is provided with play relative to the spherical outer surface $19_5$ of the ball cage $17_5$ and cannot take on any guiding function relative to the cage. The inner surface $20_5$ of the ball cage $17_5$ constitutes a continuously curved surface which extends symmetrically relative to the central plane. The curvature is such that, in half a longitudinal section, it forms two points of contact with an inscribed circle. The inner joint part $13_5$ comprises an outer face $23_5$ which consists of two spherically curved surface portions with a central cylindrical turned region, as indicated by the continuation, in dashed lines, of the spherical shape. As a result, there are obtained two approximately edge-like annular faces in the region of the curved surface portions at the inner joint part $13_5$ which are effective as guiding faces $27_1$, $27_2$ for the ball cage $17_5$ and whose position remains unchanged when the joint is in an articulated position wherein the ball cage is set on to the angle-bisecting plane between the outer joint part and the inner joint part.

Figure 6:
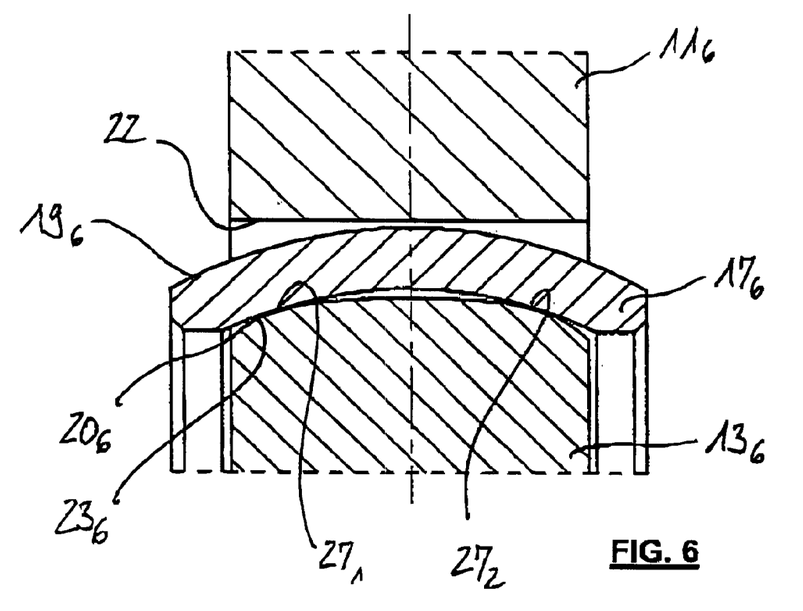
FIG. 6 shows a partial section through an inventive joint in a fourth embodiment.

FIG. 6 shows a partial section through an inventive joint wherein the outer joint part $11_6$, the inner joint part $13_6$ and the ball cage $17_6$ are sectioned in the region between two ball tracks. The cage $17_6$ comprises a spherical outer surface $19_6$ whose center is positioned concentrically in the joint center, but which has no further function. The outer joint part $11_6$ comprises an entirely cylindrical inner face 22 which is provided with play relative to the spherical outer surface $19_6$ of the ball cage $17_6$ and cannot take on any guiding function relative to the cage. The inner surface $20_5$ of the ball cage $17_5$ is an entirely spherical inner surface. The inner joint part $13_6$ comprises an outer face $23_6$ which, in a longitudinal section, forms part of a curve of the second order or a higher order, with the curvature being such that, in the longitudinal section, it forms two points of contact with an inscribed circle. As a result, there are obtained two approximately edge-like annular faces at the inner joint part $13_6$ which are effective as guiding faces $27_1$, $27_2$ for the ball cage $17_6$ and which, when the joint is in an articulated position wherein the ball cage is set on to the angle-bisecting plane between the outer joint part and the inner joint part, slightly move away from their position at the inner joint part.

Figure 7:
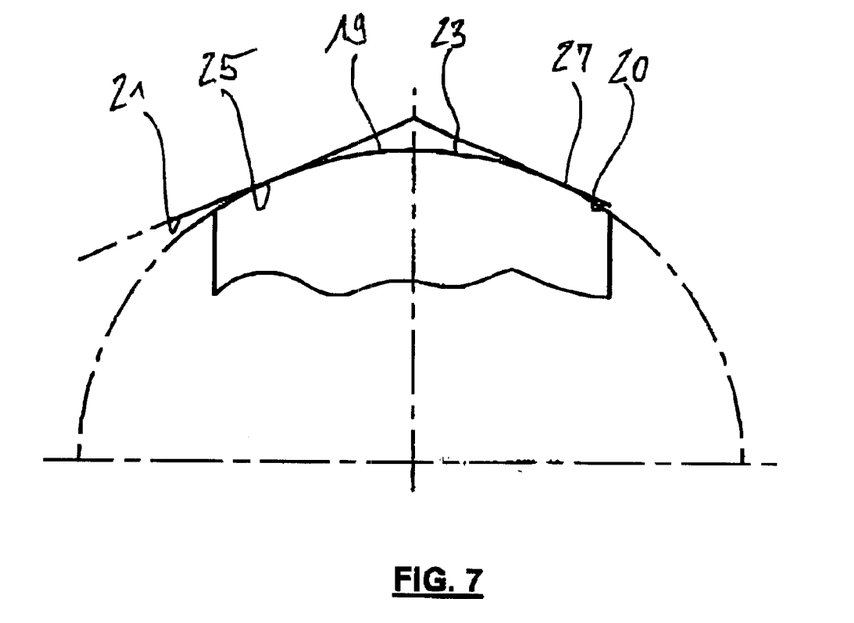
FIGS. 7–11 and 13–18 show contours of inner and outer faces which are in contact with one another.

FIGS. 7 to 18 each show two surface contours in a longitudinal section which are in contact with one another along two areas of circumferential surfaces. In accordance with the numbering in the lefthand half of each Figure, the surfaces can be the outer face 19 of the ball cage (convex) and the inner face 21 of the outer joint part (concave) which form a guiding area 25 with respect to one another. In accordance with the numbering in the righthand half of each Figure, the surfaces can be the outer face 23 of the inner joint part (convex) and the inner face 20 of the ball cage (concave) which form a guiding area 27 with respect to one another. The individual surface shapes are set forth with reference to the following figures:

FIG. 7 outside: double cone inside: spherical portion

Figure 8:
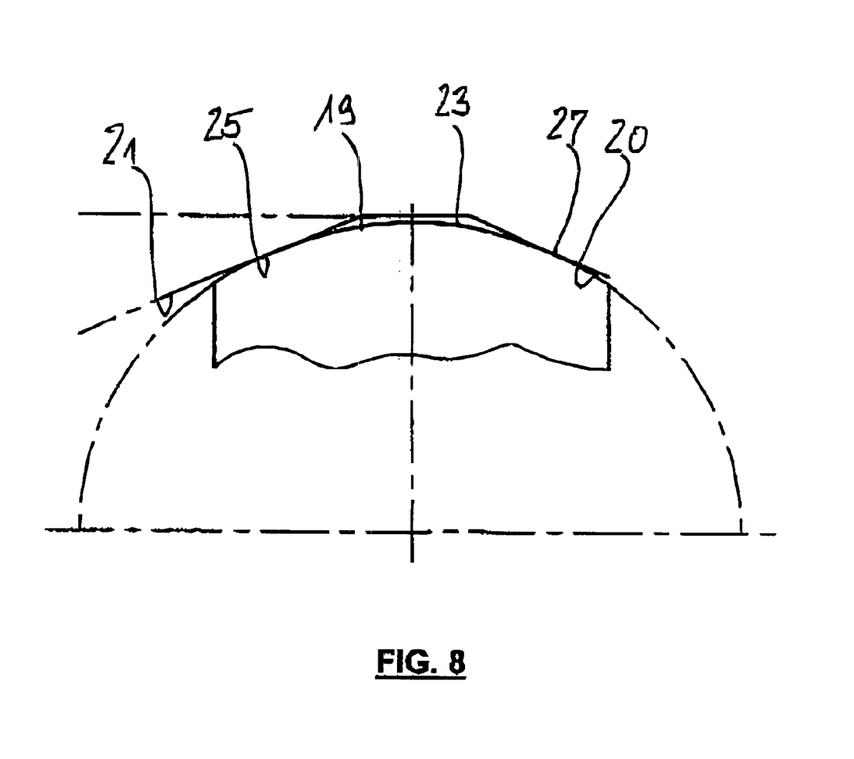

FIG. 8 outside: double cone with central cylinder inside: spherical portion

Figure 9:
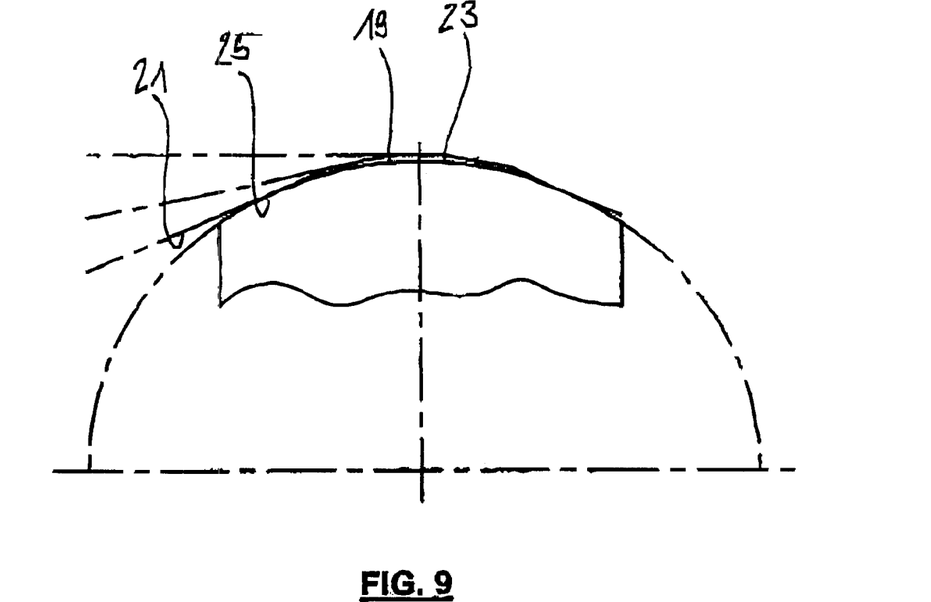

FIG. 9 outside: multiple cone (4-fold) with central cylinder inside: spherical portion

Figure 10:
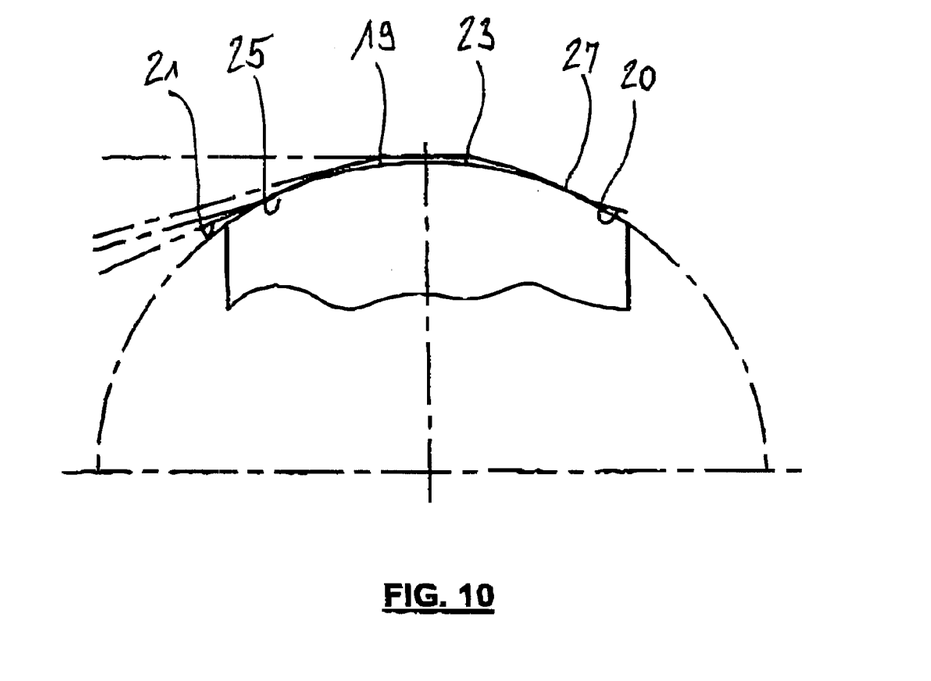

FIG. 10 outside: multiple cone (6-fold) with central cylinder inside: spherical portion

Figure 11:
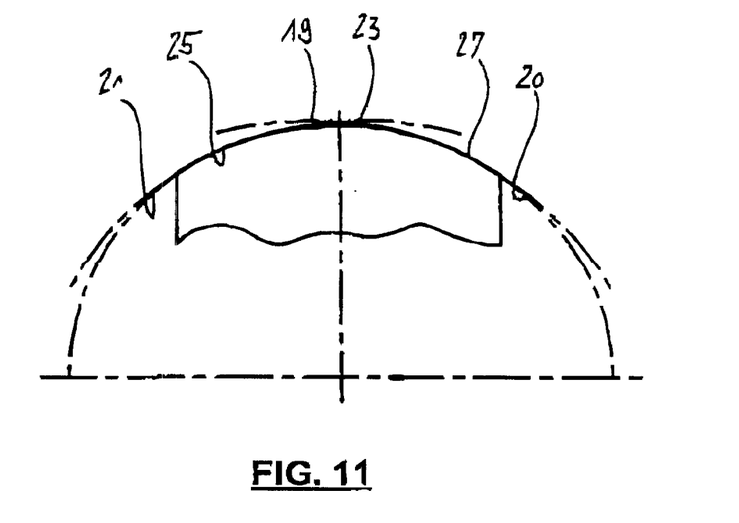
Figure 12A:
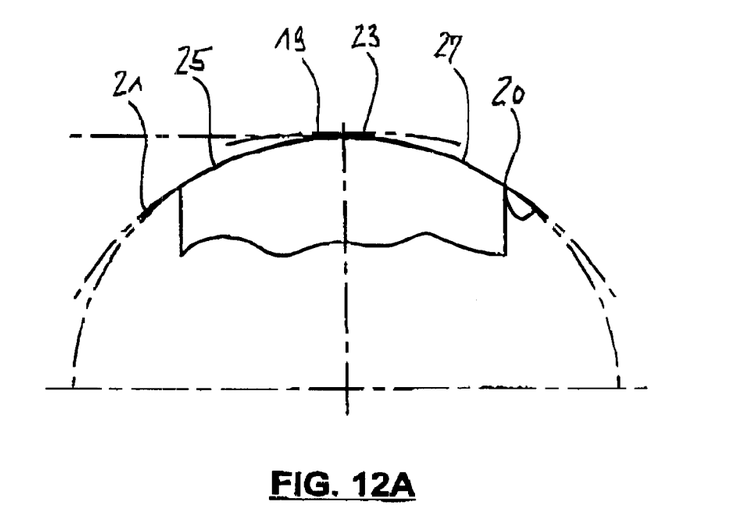
FIG. 12A shows a contour of inner and outer faces which are in contact with one another and FIG. 12B shows a detail of the contour of FIG. 12A.
Figure 12B:
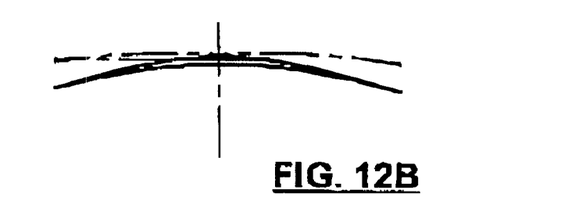
Figure 13:
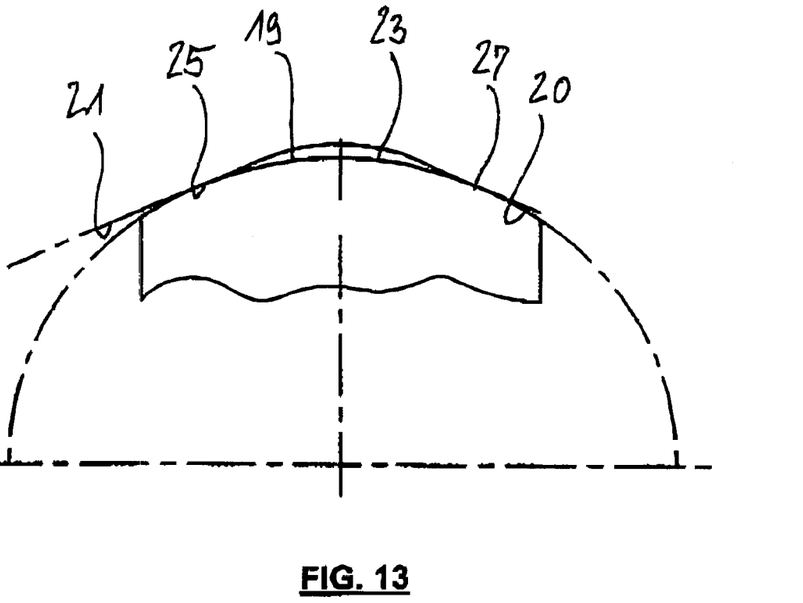
Figure 14:
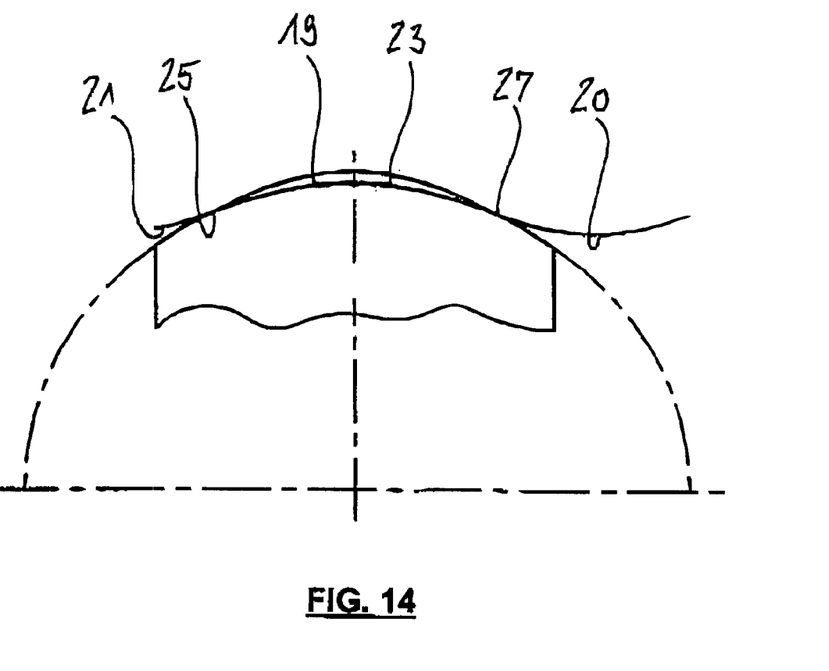
Figure 15:
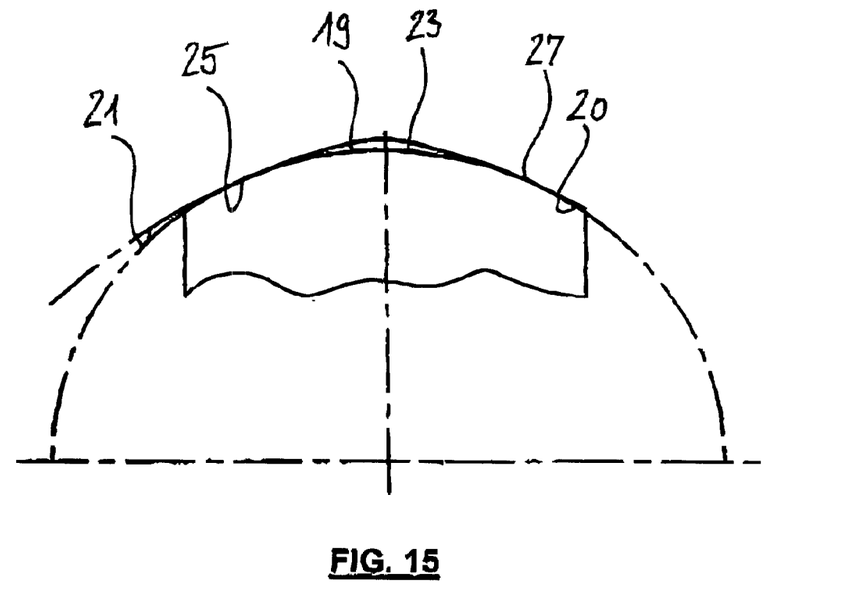
Figure 16:
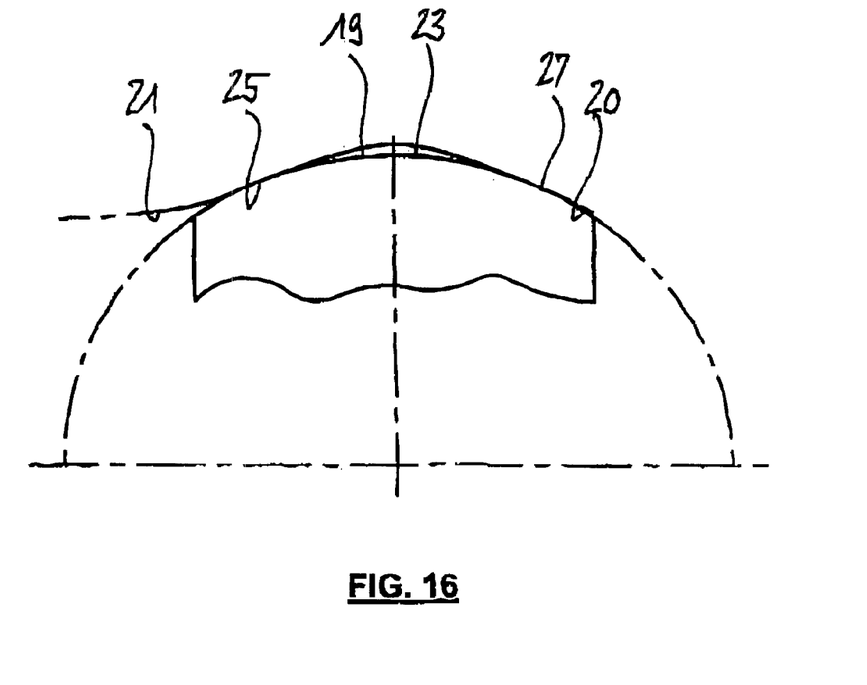
Figure 17:
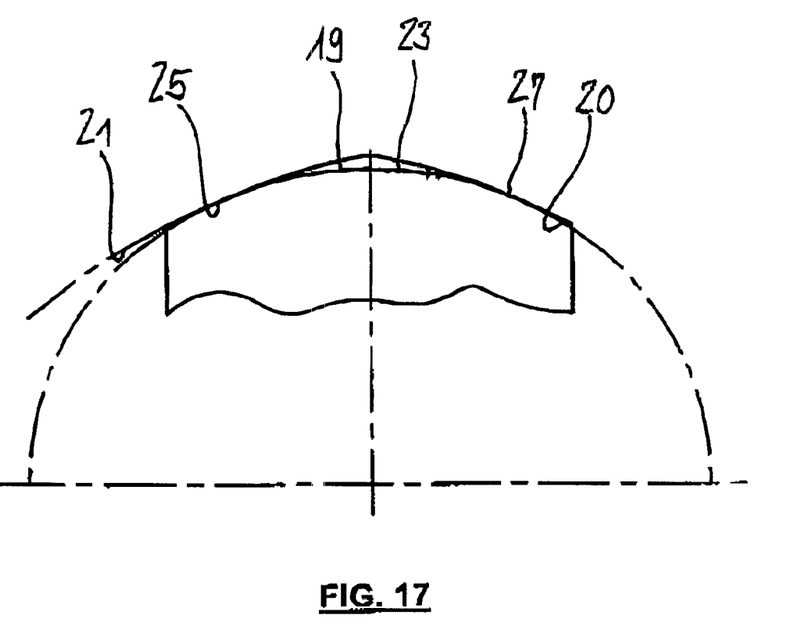
Figure 18:
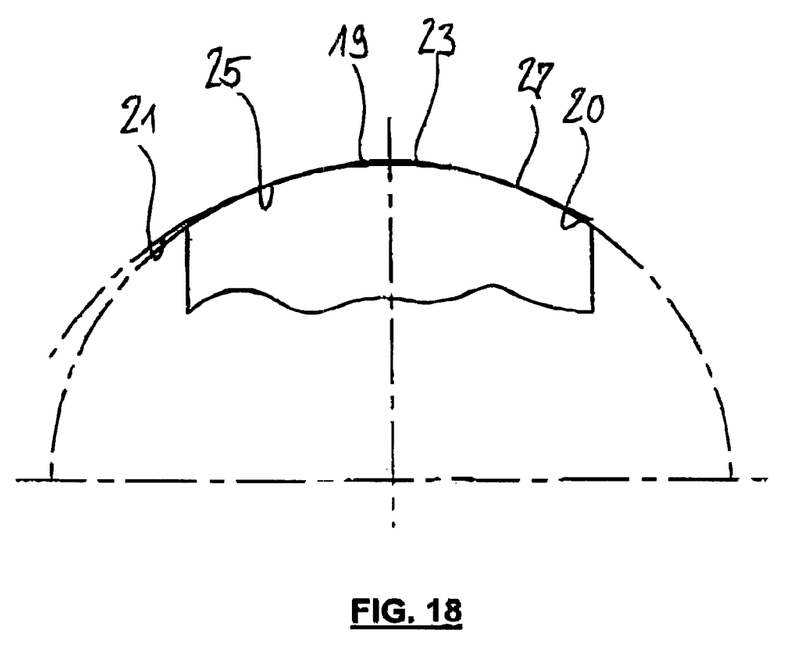

FIG. 11
outside: rotational face consisting of Gothic arches (2 circle portions with offset center)
inside: spherical portion
FIGS. 12A and 12B
outside: rotational face consisting of Gothic arches (2 circle portions with offset center) with cylindrically cut-off point
inside: spherical portion
FIG. 13
outside: rotational face consisting of central circular arch with small radius with tangentially adjoining cones
inside: spherical portion
FIG. 14
outside: rotational face consisting of central circular arch with small radius with tangentially adjoining counter circular arches
inside: spherical portion
FIG. 15
outside: rotational face consisting of curve of $2^{nd}$ order (parabola)
inside: spherical portion
FIG. 16
outside: rotational face consisting of curve of $4^{th}$ order
inside: spherical portion
FIG. 17
outside: rotational face consisting of hyperbola
inside: spherical portion
FIG. 18
outside: rotational face consisting of ellipsoidal portion
inside: spherical portion From the foregoing, it can be seen that there has been brought to the art a new and improved constant velocity fixed joint which overcomes the disadvantages of the prior art joints. While the invention has been described in connection with one or more embodiments, it should be understood that the invention is not limited to these embodiments. On the contrary, the invention covers all alternatives, modifications and equivalents as may be included within the spirit and scope of the appended claims.

What is claimed is:

1. A constant velocity fixed joint comprising:

an outer joint part (11) forming an annular member with a first longitudinal axis and comprising first ball tracks (12), wherein the first ball tracks (12) extend at a distance from the first longitudinal axis and each form a first angle of crossing ($\alpha_1$, $\alpha_1'$) therewith;

an inner joint part (13) forming a hub with a second longitudinal axis and comprising second ball tracks (14), wherein the second ball tracks (14) extend at a distance from the second longitudinal axis and each form a second angle of crossing ($\alpha_2$, $\alpha_2'$) therewith, wherein the first ball tracks (12) and the second ball tracks (14) are circumferentially distributed and associated with one another in pairs, with the angles of crossing ($\alpha_1/\alpha_2$, $\alpha_1'/\alpha_2'$) associated with the individual pairs of ball tracks ($12_1/14_1$, $12_2/14_2$) being identical in size and opening in opposite directions relative to the first and second longitudinal axes, and wherein when the first and second longitudinal axes coincide, the points of intersection of the pairs of ball tracks (12, 14) form a central joint plane; and an annular ball cage (17) arranged between the outer joint part (11) and the inner joint part (13) and comprising circumferentially distributed cage windows (16) in which torque transmitting balls (15) are held in a common plane;

wherein the outer joint part (11) comprises two separate circumferential areas which are positioned on either side of the central joint plane and which are interrupted by the first ball tracks (12), said areas comprising inner guiding faces (25) which are simultaneously in guiding contact with an outer counter face (19) of the ball cage (17).

2. A joint according to claim 1 wherein the inner joint part (13) is permanently provided with play relative to an inner counter face (20) of the ball cage (17).

3. A joint according to claim 1 wherein the ball cage (17) approximately forms a central portion of a spherical shell, and has an approximately constant wall thickness.

4. A joint according to claim 1 wherein the inner face ($21_4$) of the outer part (11) is internally spherical and that, in the longitudinal section, the outer surface ($19_4$) of the ball cage (17) is produced by at least a second order curve.

5. A joint according to claim 1 wherein the outer face (24) of the inner joint part (13) is formed by a spherical face with a central cylindrical intermediate portion.

6. A joint according to claim 1 wherein the circumferential areas serving as guiding faces (25) are designed approximately edge-like.

7. A joint according to claim 1 wherein the first angles of crossing and the second angles of crossing in each of the joint parts (11, 13) are positioned alternately relative the first and second longitudinal axes across the circumference.

8. A joint according to claim 1 the angles of crossing range between 11° and 15°.

* * * * *